Dec. 1, 1942. A. SIMMON 2,303,767
RANGE FINDER
Filed Oct. 1, 1941 2 Sheets-Sheet 1
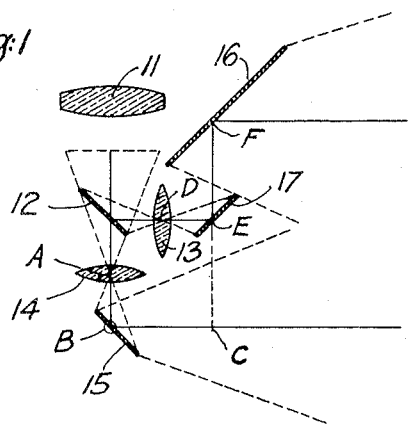
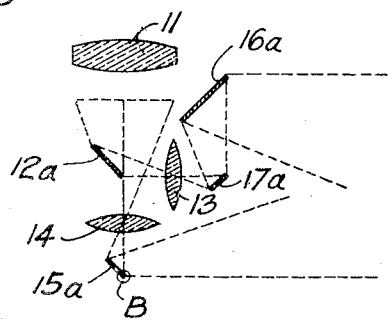
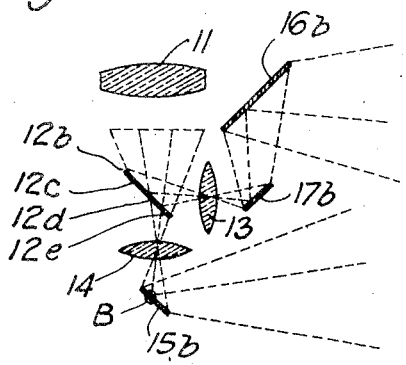
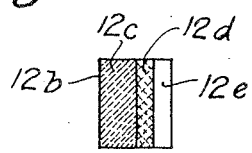
INVENTOR:
Alfred Simmon
BY Walter E. Wallheim
ATTORNEY.

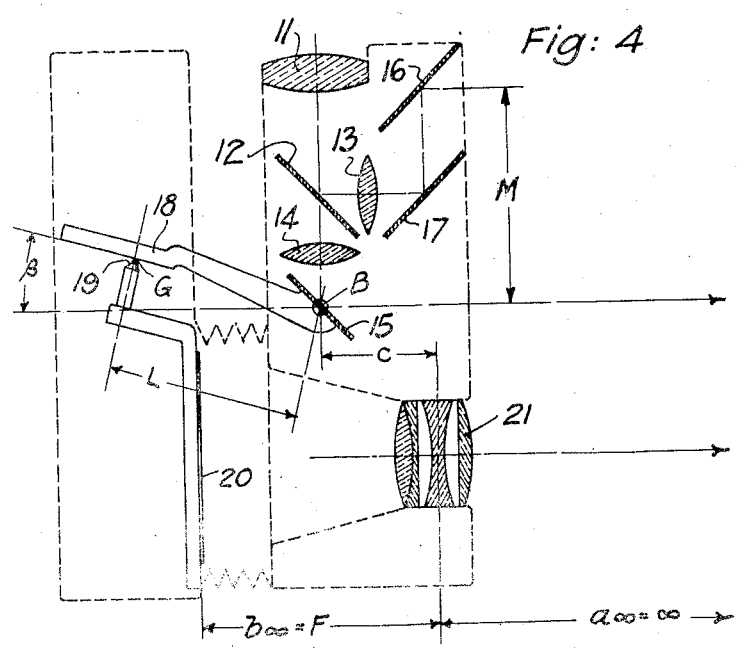
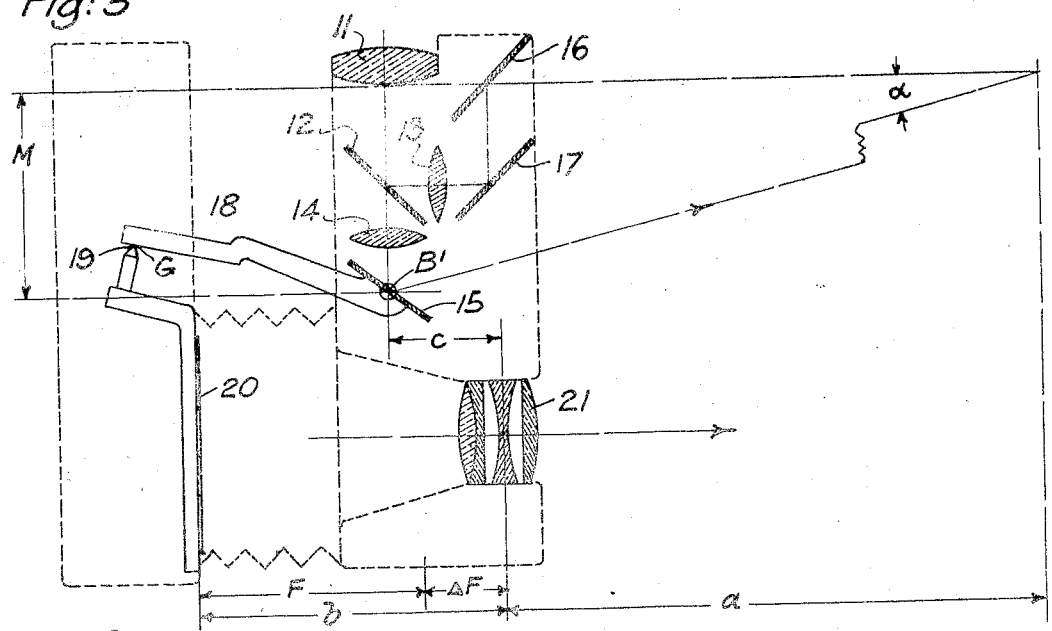
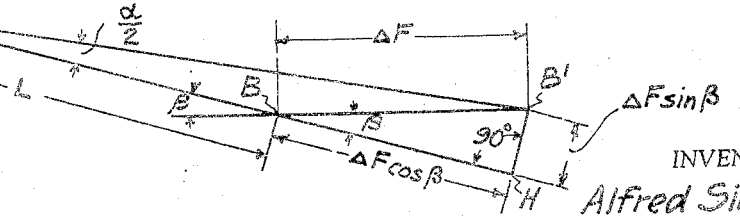

Patented Dec. 1, 1942

2,303,767

UNITED STATES PATENT OFFICE 2,303,767

RANGE FINDER

Alfred Simmon, Jackson Heights, N. Y., assignor to Simmon Brothers Inc., Long Island City, N. Y., a corporation of New York Application October 1, 1941, Serial No. 413,084

15 Claims. (Cl. 95—44)

Modern hand cameras may be divided into two distinct types, namely, "Reflex" cameras and "Range Finder" cameras.

The finder of the "Reflex" type camera is equipped with a ground glass, a 45° mirror, and a lens, which may be either the camera lens or a separate lens provide for this purpose. The two images projected on the ground glass and on the film, respectively, are usually identical in size and a sharp image should be obtained on the film whenever the image on the ground glass is focused sharply by the operator. The principal advantage of the "Reflex" camera is the ease with which the composition of the picture can be controlled, since the visible image is relatively large, not inverted and readily observable from any point roughly near the vertical center line of the horizontal ground glass. There are, however, several disadvantages: It is rather difficult to judge whether any picture on a ground glass is really critically sharp, a highly corrected and therefore expensive lens is required (unless the camera lens itself is used, and then other complications arise, such as the necessity to remove the mirror from the path of light during the actual exposure) and, due to the interposed ground glass, the image will not be very bright, and under adverse light conditions, details will be difficult to distinguish. The last two disadvantages can be overcome by omitting the ground glass and arranging a large field lens at a certain distance above the plane in which an image is formed by the finder lens. This so-called "Brilliant" type viewfinder produces an extremely bright image, easily visible even in rather dim light, and a perfectly satisfactory quality can be be obtained using inexpensive lenses which do not need to be highly corrected. It will be clear, however, that this type of view finder, due to the absence of a ground glass, does no longer offer any indication as to whether the camera lens is focused sharply on the plane of the sensitive film.

"Range Finder" cameras employ range finders of the so-called "Split Field-Coincidence" type. Two pencils of light rays, emanating from two spaced points, form by suitable optical means, two images of the object to be photographed. The operator adjusts the range finder until the two images coincide, and at the same time, by suitable mechanical means, the camera lens is made to project a sharp image of this same object into the film plane. Experience has shown that it is much easier to adjust a range finder of this general type accurately and precisely than to judge whether a ground glass image is really critically sharp, and this high degree of precision is the chief advantage of the so-called "Range Finder" camera.

Numerous attempts have been made to combine the advantages of both systems; i. e., to design a reflex type view finder, and particularly a so-called "Brilliant" finder, equipped with a split field.

None of these designs has been successful because they failed to meet one or both of the following conditions:

1. The two part images should either be of equal size, or the smaller one should cover at least approximately 25 percent of the full area of the image. Unless this condition is met, it is difficult for the observer to locate the vital part of the picture, on which he wishes to focus, in the field of the smaller part image.

2. It should not be necessary to observe the finder image from a point absolutely accurately on the center line of the finder, but reasonable deviations should not affect either the size of the field nor the accuracy of the focusing, nor should there be any other objectionable consequences.

For the purpose of this analysis, range finders may be divided into two general types, the "unbalanced" and the "balanced" type. In the "unbalanced" type, the rays of light forming one image are slightly longer than the rays of light forming the other image, whereas in the "balanced" type, the paths of both rays are of equal length.

Many range finders used in present cameras belong to the first; i. e., the "unbalanced" type as, for example, the range finders on the so-called Contax, Leica, and Speed Graphic cameras. Due to the fact that one pencil of rays is somewhat longer than the other pencil, the size of both part images of the same object will not always be of exactly identical size. This means that it will not be possible to have the respective images of all points contained in the object plane which is being focused upon coincide in the range finder at the same time. For instance, if one focuses on a building with its front at right angles to the center line of the camera and using a range finder with a vertical base, all images of the upper story windows and all images of the lower story windows, respectively, formed by one pencil of light rays should coincide with all corresponding images formed by the second pencil of rays at the same time, but due to the fact that the apparent height of the building, as seen in the two parts of the view finder, will not be exactly the same, this condition will not be exactly met. This means that a considerable error may be introduced in measuring the distance, depending upon whether one makes the images of the upper or of the lower story windows coincide, and it is therefore necessary in range finders of this "unbalanced" type to camouflage this effect by the simple expedient of making the field of one part image very small which makes the discrepancy in size between the two images of a given object formed by the two pencils of rays unnoticeable, but which at the same time renders the range finder slower to use and considerably less convenient. In particular, an appreciable amount of time is usually lost before the operator is able to locate the important part of the picture on which he wants to focus in the field of the smaller part image so that the two corresponding images of this particular point can be brought to coincidence. This effect becomes worse with increasing distance between the two pencils of light rays or base distance, which is unfortunate, since a relatively large base distance is otherwise very desirable in order to obtain better accuracy.

The "unbalanced" range finder therefore fails to meet the aforementioned first condition; i. e., it is impossible to provide part images of convenient size, since one must be quite small in order to hide the effect of slightly unequal image size.

The "balanced" type of range finder is free from this defect. Both pencils of rays are of exactly the same length, and part images formed of a given object are therefore of the same size. Thus even the smaller part image may be made as large as conditions permit.

All range finders of this "balanced" type which have been made heretofore are of substantially the same general design following the pattern of the so-called "military" range finders. In these the observer looks into two reflecting surfaces, prisms or mirrors, positioned at an angle of 45° with respect to the line of vision but at right angles to each other, one reflecting surface usually being arranged above the other one. In front of either reflecting surface, laterally disposed at a suitable distance (half base distance), is another reflecting surface arranged at an angle of approximately 45° so that the two beams are reflected into a direction approximately parallel to the original line of vision and to each other. At infinity the original line of vision and the two pencils of rays will be exactly parallel.

If an attempt is made to combine a range finder of this class with a reflex type view finder of the "Brilliant" type described above, it will be found that it fails to meet the aforesaid second condition, because the eye of the observer must be exactly and accurately in the vertical center line of the view finder. If the eye of the observer deviates even slightly from the true center line of such a finder, the parting line between the two sections of the split field does not remain stationary but performs wild gyrations and changes its shape and position with great rapidity. This is most disconcerting and causes after a short time acute physical discomfort and severe headaches.

It is the main object of the invention to overcome this difficulty in three principal ways. One is to eliminate any parting line altogether by superimposing two full size images by means of a semi-transparent mirror; a second is to arrange the parting line between the two images, not as heretofore parallel to the direction of the relative movement of the two part images, but at right angles thereto; and a third, suitably to combine these two means.

This arrangement of the parting line between the two part images must be considered to be one of the most important parts of the invention. By arranging the parting line in this manner, a very considerable freedom for the observer is obtained. The eye of the observer may now occupy any position in the general neighborhood of the vertical center line of the view finder and the parting line between the two part images will remain almost stationary and the undesirable effects described above will be absent.

The invention is illustrated by means of the following drawings in which diagrammatically the relation of the various reflecting surfaces of the range finder are shown, as well as a diagrammatic combination of a range finder embodying the principles of the invention with a conventional form of camera, also disclosed diagrammatically only. In these drawings Fig. 1 is a diagrammatic longitudinal sectional view of the reflecting surfaces of a range finder in their respective relations to each other and adjusted to infinity;

Figs. 1a, 1b, 1c show the appearance of a round object as seen through the finder disclosed in Fig. 1, adjusted, respectively, for too far a distance, for the correct distance, and for too close a distance;

Fig. 2 is a diagrammatic view similar to Fig. 1 except that the mirror reflecting surfaces reflect only the narrow portion of a reflecting beam and are thus reduced in size considerably;

Figs. 2a, 2b, 2c show a round object seen through the finder disclosed in Fig. 2, adjusted, respectively, for too far a distance, for the correct distance, and for too close a distance;

Fig. 3 is a diagrammatic view similar to Figs. 1 and 2, except that the reflecting elements are a combination of both the styles shown in Figs. 1 and 2 and are of the image splitting kind;

Figs. 3a, 3b, 3c show a round object seen through the finder disclosed in Fig. 3, also adjusted, respectively, for too far a distance, for the correct distance, and for too close a distance;

Fig. 3d is a diagrammatic plan view of a three part mirror used in the finder shown in Fig. 3;

Fig. 4 shows diagrammatically a longitudinal sectional view of a camera in broken lines with a range finder embodying the principles of the invention in the infinity position;

Fig. 5 is a view similar to Fig. 4 but focused at a relatively close object; and Fig. 6 is a diagram showing the relation of an operating lever and a swiveling mirror, as will be explained more in detail hereafter, to satisfy a governing formula.

Like characters of reference denote similar parts through the several drawings and the following specification.

Referring to Fig. 1, the finder consists, as shown diagrammatically, of a field lens 11, an image splitting or superimposing mirror 12, angularly disposed to a vertical axis through the optical center of the lens 11, an image forming finder lens 13 in front of mirror 12, and another image forming finder lens 14 below mirror 12 and in line with the vertical axis of lens 11. Lenses 13 and 14 are of the same focal length and cover the same angle as the camera lens. 15 is a mirror swivelling around a fulcrum B disposed below the lens 14 and reflects the first pencil of light rays. 16 and 17 are fixed mirrors, parallel to each other, in front of the before mentioned vertical axis, and arranged at an angle of substantially 45° with respect to the line of vision, reflecting the second pencil of light rays. As shown, both pencils of rays are parallel, the finder being focused at infinity.

As can be seen, this general arrangement of reflecting surfaces, with respect to a horizontal plane through the finder, is not symmetrical, but by choosing the proper dimensions, nevertheless, both pencils of rays can be made of exactly the same lengths so that both part images will be of identical size when viewed through the lens 11. Obviously it is necessary to make $$AB+BC=DE+EF$$

The image splitting or superimposing element 12 may be made in three different ways. By making the element a semi-transparent mirror in the arrangement shown in Fig. 1, the operator would see two full-sized images superimposed.

In Fig. 2 the image splitting element 12a is a mirror of 100 percent reflectivity at one side of the vertical axis through the field lens 11, and the other mirrors 15a, 16a and 17a are correspondingly reduced in length. With the arrangement shown in Fig. 2, the observer would see half the image as formed by lens 13 and the other half as formed by lens 14, the parting line between the two images being at right angles to the relative movement of the two part images.

In Fig. 3 a third modification is shown. For the image splitting element a mirror 12b is used, as illustrated diagrammatically in Fig 3d. This mirror has three zones, one numbered 12c covering about one-half of its length of substantially 100 percent reflectivity, another narrower one numbered 12d of one-half reflecting and one-half transparent characteristic, and a third one numbered 12e entirely transparent. The lengths of mirrors 15b, 16b and 17b are approximately between lengths of mirrors 15, 16 and 17 of Fig. 1, and mirrors 15a, 16a and 17a of Fig. 2. With the device shown in Fig. 3, the observer would see three zones, each occupying approximately one-third of the full length of the field. The first zone would be formed by lens 13, the third zone would be formed by lens 14, and the center zone would show images formed by either lens superimposed upon each other.

In Figs. 1a, 1b and 1c are shown diagrammatically the appearance of a round object 22 as viewed through the field lens 11 in the arrangement shown in Fig. 1, the mirror 12 being semi-transparent covering the entire field and set, respectively, for too far a distance in Fig. 1a, for the correct distance in Fig. 1b, and for too close a distance in Fig. 1c. Similar views of a round object 22 are shown in Figs. 2a, 2b and 2c, in which the zones 23 and 24 show the object 22 as reflected by the two half mirrors described in connection with Fig. 2, namely, in Fig. 2a set for too far a distance, in Fig. 2b for the correct distance and in Fig. 2c for too near a distance. Similarly in Figs. 3a, 3b and 3c is shown the round object 22 as viewed by means of the arrangement described in Fig. 3. In Figs. 3a, 3b and 3c, the three zones as reflected by, respectively, the one hundred percent reflectivity mirror, the mirror of one-half reflecting and one-half transparent characteristic, and the one entirely transparent, are designated as, respectively, 25, 26 and 27. In these figures, also, Fig. 3a shows the object when the finder is set at too far a distance, Fig. 3b at the correct distance, and Fig. 3c at too near a distance.

Either one of the three image splitting or superimposing methods is best adapted for certain applications. For long focus lenses, such as telephoto lenses, covering only a relatively small angle, the first method is preferable. As far as ease of operation is concerned, this method is perfectly practical for all lenses, but for ordinary lenses covering a relatively wide angle, reflecting surfaces of unduly large size may be necessary.

The second method is adapted for all lenses but requires a certain training for the observer, since it is necessary to judge whether the image of a given object is complete or whether certain center portions are missing or whether certain center portions are shown twice. This method, however, has the definite advantage that relatively small mirrors may be used. As can be seen in Fig. 1, all mirrors are arranged at an angle of 45° with respect to the line of vision. Since all mirrors reflect diverging beams of light, it will be clear that one side of the mirror must be very large in order to cover as large a portion of the field as the other side. By dividing the field in two parts, the mirrors can be proportioned in such manner that most mirrors reflect only the narrow portion of the diverging beam, and thus their size can be reduced considerably as shown in Fig. 2.

The operation of the range finder can be improved by using an image splitting element according to Fig. 3. This arrangement combines the advantages of both systems shown in Figs. 1 and 2, i. e., it is very easily possible to judge whether the part images of the same object coincide by observing the center zone, and it still is not necessary to use inconveniently large mirrors for ordinary lenses.

The disposition of reflecting surfaces shown in Figs. 1, 2 and 3 has the distinct advantage that all mirrors are arranged at right angles to one common plane whereby manufacturing is facilitated and a greater degree of accuracy made possible.

The range finder must be coupled with the focusing movement of the camera lens in such a way that the image projected by the lens upon the sensitive surface of the film will be sharp and that the two images formed by the range finder will coincide at the same time. The simple and very accurate manner in which this is being done will now be described and reference is being made to Figs. 4, 5 and 6 which illustrates diagrammatically the principles involved.

The camera consists of two parts which can be adjusted with respect to each other for focusing and which are connected by suitable flexible but light-tight means such as bellows. The front part contains the main lens 21 and the range finder, and is shown schematically in Figs. 4 and 5 in dotted lines. It will be understood that in reality the range finder will, preferably, not be mounted straight above the main lens as shown but that the two will be mounted side by side in such a manner that the distance between the two beams of the range finder and the beam of the lens will be as small as possible in order to minimize parallax. The range finder contains mirror 15 which swivels around fulcrum B, and which is connected to a lever 18.

The second part of the camera contains the main camera housing which includes provisions to support a sensitive film 20, and an element having a knife edge 19 cooperating with lever 18. Both the knife edge and the lever are preferably made from hardened steel in order to minimize friction and wear, and lever 18 is biased by a spring (not shown) so that it will always be in contact with knife edge 19.

The whole arrangement is shown in Fig. 4 in the infinity position corresponding to Fig. 1, and in Fig. 5 as focused at a relatively close object. In the infinity position, the effective length of lever 8 is called L and this lever comprises an angle $\beta$ with the horizontal center line. The base distance of the range finder is M. It can be shown that by choosing the dimensions L, M and $\beta$ properly, the range finder can be made to correspond with a very high degree of accuracy with the focusing movement of the lens.

As mentioned above, the camera is shown as focused at infinity in Fig. 4. The fulcrum of mirror 15 is B. If we focus this camera at a close object, the entire front part will be moved away from the rear part and the fulcrum of mirror 15 will now be at B' which is slightly farther away from the film than B, see Fig. 5. The knife edge 19, of course, remains stationary with respect to the sensitive film 20.

A diagram can now be drawn as in Fig. 6 containing points G, B and B', and by extending GB and drawing a line from B' perpendicular to the extended line GB, meeting it at H.

By moving the front part of the camera from the position shown in Fig. 4, to the position shown in Fig. 5, mirror 15 rotates slightly. Since the angle between the reflected beam and the horizon is $\alpha$, it will be understood that mirror 15 rotates by an angle $$\frac{\alpha}{2}$$

or with reference to Fig. 6, angle $$BGB' = \frac{\alpha}{2}$$

It will also be clear that angle $B'BH = \beta$. The distance $BB'$ is the distance by which the lens must be advanced from the infinity position in order to focus at a close object, and we may call this distance $\Delta F$. From triangle BB'H we can derive the following equations:

$$B'H = \Delta F \sin \beta$$

$$BH = \Delta F \cos \beta$$

Similarly, contemplating triangle GHB':

$$GH = L + \Delta F \cos \beta$$

$$\tang \frac{\alpha}{2} = \frac{B'H}{GH} = \frac{\Delta F \sin \beta}{L + \Delta F \cos \beta}$$

The distance between the optical center of the lens and the object plane which is being focused is called $a$, Fig. 5. The corresponding distance between the optical center of the lens and the sensitive film is called $b$. In the infinity position, this distance equals the focal length of the lens and in any other position it equals the focal length of the lens plus the increment which we have called $\Delta F$, or $b = F + \Delta F$. The vertical center line of the range finder is usually not in the same plane as the optical center of the lens and we may assume that it is disposed rearwards by a distance $c$.

With reference to Fig. 5, we have $$\tang \alpha = \frac{M}{a+c}$$

Since $\alpha$ is quite small, tang $\alpha$ is very nearly $$2 \tang \frac{\alpha}{2}$$

or $$\frac{M}{a+c} = 2 \frac{\Delta F \sin \beta}{L + \Delta F \cos \beta}$$

$$a = \frac{M}{2 \tang \beta} + \frac{ML}{2 \Delta F \sin \beta} - c \quad (1)$$

The same distance $a$ can be computed from the optical equations of the main camera lens as follows:

This lens is sharply focused on an object plane having a distance $a$ from its optical center if the focusing equation is met:

$$\frac{1}{a} + \frac{1}{b} = \frac{1}{F}$$

This can be transformed as follows:

$$\frac{1}{a} = \frac{1}{F} - \frac{1}{b} = \frac{b-F}{bF}$$

$$\frac{1}{a} = \frac{(F+\Delta F) - F}{(F+\Delta F)F} = \frac{\Delta F}{F^2 + F \Delta F}$$

(Substituting $F + \Delta F$ for $b$)

$$a = \frac{F^2}{\Delta F} + F \quad (2)$$

Both equations for $a$ will be satisfied at all times if we make:

$$\frac{F^2}{\Delta F} = \frac{ML}{2 \Delta F \sin \beta}$$

and $$F = \frac{M}{2 \tang \beta} - c$$

These expressions can be transformed to read:

$$\tang \beta = \frac{M}{2(F+c)}$$

and $$L = \frac{2F^2}{M} \sin \beta$$

In other words, after choosing the base distance of the range finder which should preferably be made as large as physical conditions permit, the angle of the mirror actuating lever to the horizontal will be $$\tang \beta = \frac{M}{2(F+c)}$$

and its length in the infinity position:

$$L = \frac{2F^2}{M} \sin \beta$$

The range finder and the focusing position of the camera lens will then be synchronized with a very high degree of accuracy and by very simple means.

The foregoing fully so reveals the principles of the invention that others can, by applying current knowledge of the prior art, readily adapt them for various utilizations and styles of cameras, and therefore such adaptations should be, and are intended to be, comprehended within the meaning and range of equivalency of the appended claims.

For instance, while I have shown the lower mirror in the vertical axis of the field lens of the range finder fulcrummed for adjustment by the knife edge 19 acting against lever 18, any other mirror in the finder except the one immediately below the field lens may be so arranged.

Furthermore, while the range finder is part of the front part of the camera, as disclosed in the drawings, the finder may be incorporated in the back part, and the element with knife edge be part of the front of the camera moving in unison with the lens, in which case the inclined lever fulcrummed to one of the mirrors projects forwardly to engage the knife edge. Many other changes may be found expedient and still fall within the scope of the claims.

What I claim as new, is:

1. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, one of the said mirrors having a horizontal fulcrum at right angles to the axis of said camera lens and being movable about said fulcrum in unison with the movement of said camera lens relative to said film holding means.

2. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said lower mirror having a horizontal fulcrum at right angles to the axis of said camera lens and being movable about said fulcrum in unison with the movement of said camera lens relative to said film holding means.

3. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said upper mirror being semi-transparent and one of said other mirrors having a horizontal fulcrum at right angles to the axis of said camera lens and being movable about said fulcrum in unison with the movement of said camera lens relative to said film holding means.

4. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said upper mirror constituting an optical element having zones of various degrees of reflectivity, and one of said other mirrors having a horizontal fulcrum at right angles to the axis of said camera lens and being movable about said fulcrum in unison with the movement of said camera lens relative to said film holding means.

5. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said upper mirror constituting an optical element having zones of various degrees of reflectivity, and the said lower mirror having a horizontal fulcrum at right angles to the axis of said camera lens and being movable about said fulcrum in unison with the movement of said camera lens relative to said film holding means.

6. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said upper mirror constituting an optical element having a zone of full reflectivity, a semi-transparent zone and another zone of full transparency, and one of said other mirrors having a horizontal fulcrum at right angles to the axis of said camera lens and being movable about said fulcrum in unison with the movement of said camera lens relative to said film holding means.

7. In a photographic camera, a camera lens, film holding means, means for changing the relation between said lens and said film holding means for focusing purposes including a range finder comprising a field lens, an upper and a lower mirror angularly disposed to and at one side of a vertical axis through said field lens, a finder lens disposed between said mirrors and in axial alignment with said field lens, a pair of inclined mirrors in front of said upper mirror, and another finder lens between said pair of mirrors and said upper mirror, one of said mirrors having a horizontal fulcrum at right angles to the axis of said camera lens and being movable about said fulcrum in unison with the movement of said camera lens relative to said film holding means.

8. In a photographic camera, a camera lens, film holding means, means for changing the relation between said lens and said film holding means for focusing purposes including a range finder comprising a field lens, an upper and a lower mirror angularly disposed to and at one side of a vertical axis through said field lens, a finder lens disposed between said mirrors and in axial alignment with said field lens, a pair of inclined mirrors in front of said upper mirror, and another finder lens between said pair of mirrors and said upper mirror, the said lower mirror having a horizontal fulcrum at right angles to the axis of said camera lens and being movable about said fulcrum in unison with the movement of said camera lens relative to said film holding means.

9. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, one of the said mirrors having a horizontal fulcrum at right angles to the axis of said camera lens and being movable about said fulcrum in unison with the movement of said camera lens relative to said film holding means, the said mirrors being so disposed angularly that both pencils of rays impinging thereupon will be of the same lengths.

10. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors in axial alignment with said field lens and located in said axis at a point A, the said axis passing through said lower mirror at a point B, a pair of inclined mirrors, one above the other, in front of said upper mirror, and another finder lens at a point D in a horizontal axis passing through the point of intersection of said vertical axis and said upper mirror, said horizontal axis intersecting the lower mirror of said pair at a point E, a line parallel to said vertical axis through point E intersecting the upper mirror of said pair at a point F and a horizontal line through point B at C, the distances AB+BC= DE+EF, so that both pencils of rays impinging upon the mirrors will be of the same lengths, one of said mirrors having a horizontal fulcrum at right angles to the axis of said camera lens and being movable about said fulcrum in unison with the movement of said camera lens relative to said film holding means.

11. In a photographic camera, a camera lens, film holding means, means for changing the relation between said lens and said film holding means for focusing purposes including a range finder comprising a field lens, an upper and a lower mirror angularly disposed to a vertical axis through said field lens, a finder lens disposed between said mirrors in axial alignment with said field lens and located in said axis at a point A, the said axis passing through said lower mirror at a point B, a pair of inclined mirrors, one above the other, in front of said upper mirror, and another finder lens at a point D in a horizontal axis passing through the point of intersection of said vertical axis and said upper mirror, said horizontal axis intersecting the lower mirror of said pair at a point E, a line parallel to said vertical axis through point E intersecting the upper mirror of said pair at a point F and a horizontal line through point B at C, the distances AB+BC=DE+EF, so that both pencils of rays impinging upon the mirrors will be of the same lengths, the said lower mirror having a horizontal fulcrum at right angles to the axis of said camera lens and being movable about said fulcrum in unison with the movement of said camera lens relative to said film holding means.

12. In a photographic camera, a front part and a back part adjustable with respect to each other, a camera lens, a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, one of said mirrors having a horizontal fulcrum at right angles to the axis of said camera lens, a lever connected to said fulcrum, film holding means within said back part, and an element with a knife edge adapted to contact said lever and rotate said fulcrumed mirror by the movement of said camera lens relative to said film holding means for focusing purposes.

13. In a photographic camera, a front part and a back part adjustable with respect to each other, a camera lens, a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said lower mirror having a horizontal fulcrum at right angles to the axis of said camera lens, a lever connected to said fulcrum, film holding means within said back part, and an element with a knife edge adapted to contact said lever and rotate said fulcrumed mirror by the movement of said camera lens relative to said film holding means for focusing purposes.

14. In a photographic camera, a front part and a back part adjustable with respect to each other, a camera lens, a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, one of said mirrors having a horizontal fulcrum at right angles to the axis of said camera lens, a lever, having an inclined surface, connected to said fulcrum, film holding means within said back part, and an element with a knife edge adapted to contact said inclined surface of the lever and rotate said fulcrumed mirror by the movement of said camera lens relative to said film holding means for focusing purposes, the tangent of the angle between the said inclined surface of the lever and the optical axis of the camera lens in the infinity position being equal the base distance of the range finder divided by twice the focal length of the camera lens plus the distance between said vertical axis of the range finder and the optical center of the camera lens, and the length of the lever from said fulcrum to the point of contact with said knife edge being equal to twice the square of the focal length of the camera lens multiplied by the sine of said angle, divided by the base distance of said range finder.

15. In a photographic camera, a front part and a back part adjustable with respect to each other, a camera lens, a range finder comprising a field lens, an upper and a lower mirror angularly disposed to a vertical axis through said field lens, a finder lens disposed between said mirrors and in axial alignment with said field lens, a pair of inclined mirrors in front of said upper mirror, and another finder lens between said pair of mirrors and said upper mirror, the said lower mirror having a horizontal fulcrum at right angles to the axis of said camera lens, a lever, having an inclined surface, connected to said fulcrum, film holding means within said back part, and an element with a knife edge adapted to contact said inclined surface of the lever and rotate said fulcrumed mirror by the movement of said camera lens relative to said film holding means for focusing purposes, the tangent of the angle between the said inclined surface of the lever and the optical axis of the camera lens in the infinity position being equal the base distance of the range finder divided by twice the focal length of the camera lens plus the distance between said vertical axis of the range finder and the optical center of the camera lens, and the length of the lever from said fulcrum to the point of contact with said knife edge being equal to twice the square of the focal length of the camera lens multiplied by the sine of said angle, divided by the base distance of said range finder.

ALFRED SIMMON.